United States Patent
Murphy et al.

(10) Patent No.: US 8,094,001 B2
(45) Date of Patent: Jan. 10, 2012

(54) VEHICLE LANE DEPARTURE WARNING SYSTEM AND METHOD

(75) Inventors: Morgan D. Murphy, Kokomo, IN (US); Douglas A. Nunan, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 471 days.

(21) Appl. No.: 12/334,627

(22) Filed: Dec. 15, 2008

(65) Prior Publication Data

US 2010/0148948 A1   Jun. 17, 2010

(51) Int. Cl.
*G08B 21/00* (2006.01)
(52) U.S. Cl. ........ 340/436; 340/435; 340/905; 340/939; 701/29; 701/300; 701/301; 348/148
(58) Field of Classification Search .................. 340/435, 340/436, 439, 905, 937, 939; 701/29, 36, 701/300, 301; 348/148
See application file for complete search history.

(56) References Cited

U.S. PATENT DOCUMENTS

| 6,370,475 | B1* | 4/2002 | Breed et al. ................... | 701/301 |
| 6,385,539 | B1* | 5/2002 | Wilson et al. .................. | 701/213 |
| 6,680,674 | B1* | 1/2004 | Park .............................. | 340/905 |
| 2002/0121989 | A1* | 9/2002 | Burns ........................... | 340/901 |
| 2005/0125125 | A1* | 6/2005 | Matsumoto et al. ............ | 701/41 |
| 2010/0131148 | A1* | 5/2010 | Camhi et al. ................... | 701/29 |

* cited by examiner

*Primary Examiner* — Jennifer Mehmood
*Assistant Examiner* — Mark Rushing
(74) *Attorney, Agent, or Firm* — Lawrence D. Hazelton

(57) ABSTRACT

A vehicle lane departure warning system and method are provided. The system includes a position sensor for sensing position of a vehicle and memory storing learned vehicle path data. The system further includes a controller for processing the position data and determining a stored learned vehicle path that the vehicle is travelling on. The controller comprises logic for comparing the sensed position data to the stored learned vehicle path and determining if the vehicle is sufficiently departing from the stored learn vehicle path. The system further includes an output for providing a warning signal indicative of the vehicle departing from the stored learned vehicle path. The stored learned vehicle path is updated as the vehicle repeatedly travels on the path.

15 Claims, 5 Drawing Sheets

US 8,094,001 B2

VEHICLE LANE DEPARTURE WARNING SYSTEM AND METHOD

TECHNICAL FIELD

The present invention generally relates to navigation of a vehicle and, more particularly relates to detection and warning of departure of the vehicle from a lane of a roadway.

BACKGROUND OF THE INVENTION

Wheeled automotive vehicles frequently travel within defined lanes of a roadway, generally based on steering by an operator (driver) of the vehicle. Some vehicles are equipped with lane departure warning (LDW) systems that are designed to provide a warning indication if the vehicle departs from an identified lane of the roadway. In response to the warning, the driver of the vehicle may steer the vehicle back into the appropriate lane. Currently proposed lane departure warning systems typically include optical systems having one or more cameras configured to capture images of the roadway and to process the images to identify lane markings, such as painted lines, on the roadway. Conventional optical lane departure warning systems generally suffer during low light conditions and when lane markings are not clearly visible.

It is therefore desirable to provide for a lane departure warning system for a vehicle that does not suffer drawbacks of low light conditions and poor performance when lane markings are not clearly visible. It is further desirable to provide for a lane departure warning system for a vehicle that is easy to implement and cost affordable.

SUMMARY OF THE INVENTION

According to one aspect of the present invention, a vehicle lane departure warning system is provided. The system includes a position sensor for sensing position of a vehicle and memory storing learned vehicle path data. The system further includes a controller for processing the sensed position and determining a stored learned vehicle path as that the vehicle is traveling on. The controller comprises logic for comparing the sensed position to the stored learned vehicle path and determining if the vehicle is sufficiently departing from the stored learned path. The system further includes an output for providing a warning signal indicative of the vehicle departing from the stored learned path. According to another aspect of the present invention, the stored learned path is updated as the vehicle repeatedly travels the path.

According to a further aspect of the present invention, a method of storing learned vehicle path data in memory and warning of departure of the vehicle from a learned path is provided. The method includes the steps of sensing position of a vehicle, processing the sensed position, and determining a learned vehicle path that the vehicle is travelling on. The method also includes the step of updating the stored learned vehicle path as the vehicle repeatedly travels the path. The method further includes the steps of comparing the sensed position to the stored learned current vehicle path, determining that the vehicle is sufficiently departing from the stored learned vehicle path of the road way, and providing a warning signal indication output if the vehicle is determined to be departing from the stored learned vehicle path.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
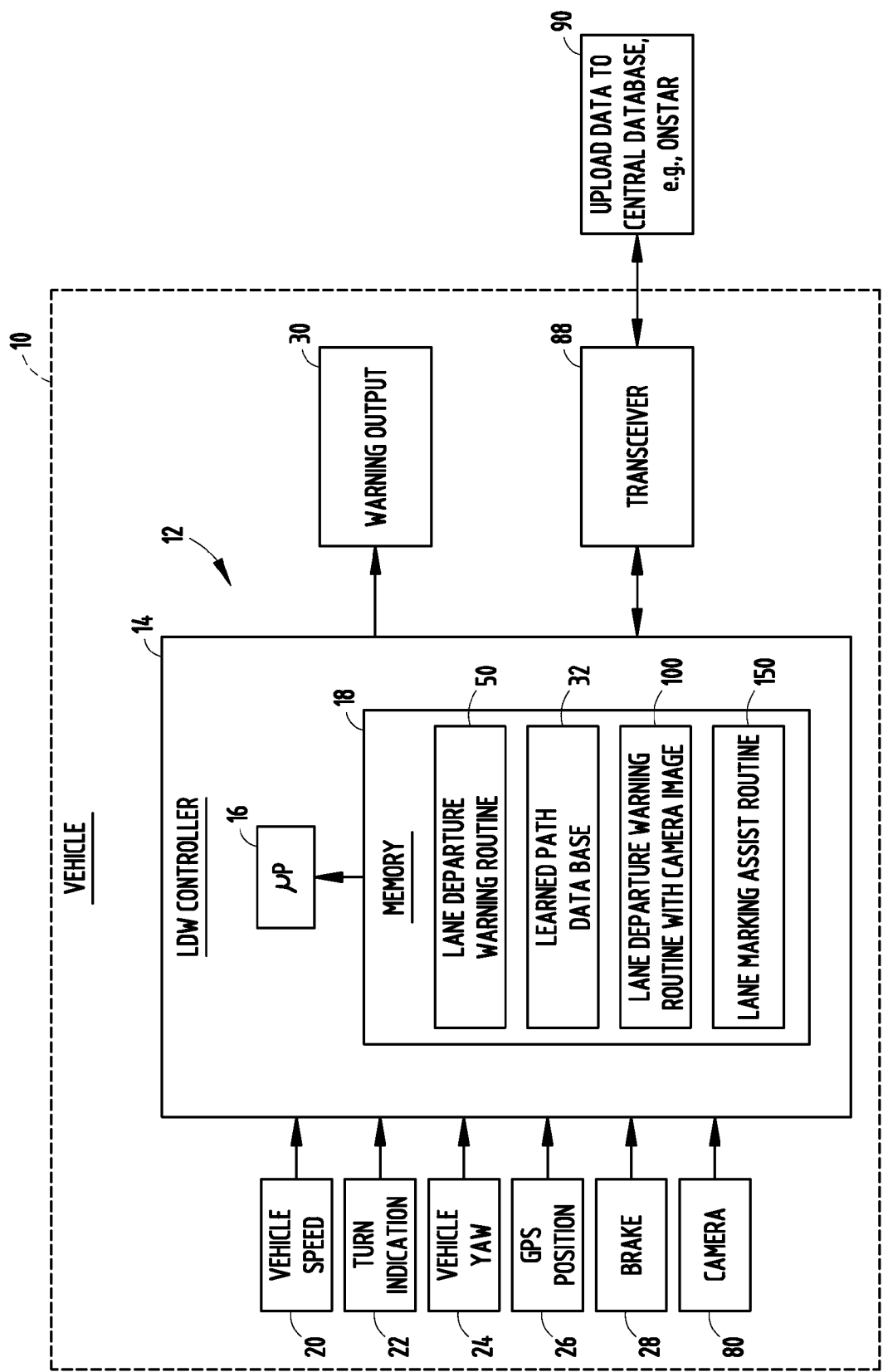
FIG. 1 is a block diagram of a vehicle employing a lane departure warning system, according to one embodiment.

Referring now to FIG. 1, block 10 depicts a vehicle, such as a wheeled automotive vehicle, equipped with a lane departure warning system 12, according to one embodiment. The vehicle 10 may include any of a number of vehicles configured to travel on a path. In the disclosed embodiment, the vehicle 10 is a wheeled vehicle having wheels adapted to engage a roadway, and the vehicle 10 is steerable to maintain the vehicle 10 within a desired path or lane of the roadway. It should be appreciated that the vehicle 10 may be steered by a driver of the vehicle 10 and that the vehicle 10 may be steered on a path, such as within a roadway lane and may depart from the lane so as to move into an adjacent lane, as should be evident to those skilled in the art.

The lane departure warning system 12 is provided on the vehicle 10 to monitor the position of the vehicle 10, to generate and update learned travel paths or lanes, to detect departure of the vehicle 10 from a learned travel path lane, and to provide an output, such as a warning to the operator of the vehicle when the vehicle 10 departs from a learned travel path lane on the roadway. The lane departure warning system 12 may also upload learned travel path data to a central database, such as OnStar®, to make learned travel path data available to other vehicles.

The lane departure warning system 12 is shown including a lane departure warning (LDW) controller 14 having various inputs 20-28 and 80 and providing a warning output 30. The controller 14 has control circuitry shown in the form of a microprocessor 16 and memory 18. It should be appreciated that the controller 14 may employ other analog and/or digital control circuitry including an application specific integrated circuit (ASIC) or other known circuitry for processing the input data, updating learned travel paths, executing one or more lane departure warning routines, outputting a lane departure warning, and uploading data to one or more central databases.

Memory 18 may include any known storage medium, such as random access memory (RAM), read-only memory (ROM), electrically erasable programmable read-only memory (EEPROM), flash memory and other memory devices. Stored within memory 18 is a learned path database 32 and logic including a lane departure warning routine 50, according to one embodiment. The learned path database 32 may contain one or more vehicle paths that have been learned and stored in memory. The learned vehicle paths may include a confidence level indicating the number of times that each vehicle path has been traveled, such that a higher confidence level is indicative of a frequently traveled path and may be considered a lane. Also shown stored within memory 18 is a lane departure warning routine 100 that processes images captured by a camera and a lane marking assist routine 150, which may be implemented, according to a second disclosed embodiment.

The lane departure warning routine 50 is executed by the microprocessor 16 to process the various inputs to determine whether the vehicle 10 is within or outside of a learned lane of the roadway, and to provide a warning output when the vehicle deviates from the learned lane. Included as inputs to the lane departure warning controller 14 is a vehicle speed signal 20 providing an indication of the speed of the vehicle. Vehicle speed may be sensed by a vehicle speed sensor or may be determined from GPS data. If the vehicle speed is too low (e.g., less than 15 mph) or too high (e.g., greater than 75 mph), the position data is not recorded and the lane departure warning system 12 may be turned off or otherwise ignored such that travel path data is not recorded and updated and a lane departure warning is disregarded. Also input to the controller 14 is a vehicle turn signal indication 22 which provides an indication that the operator of the vehicle intends to turn the vehicle 10 by steering. If the vehicle turn signal indication 22 is on, indicating that the vehicle 10 is expected to turn, the position data acquired within a time period of about ±5 seconds of the turn signal being on is not recorded and the lane departure warning routine may be turned off or ignored such that travel data is not recorded and updated and a lane departure warning is disregarded.

Also input to the controller 14 is a vehicle yaw signal which indicates the yaw of the vehicle 10 as sensed by a yaw sensor, according to one embodiment. It should be appreciated that vehicle yaw may otherwise be determined by employing two or more GPS receivers. If the vehicle yaw exceeds a threshold yaw (e.g., 0.35 radians/second) position data is not recorded, travel path data is not updated, and the lane departure warning routine 50 may be turned off or ignored such that data is not recorded or updated and a lane departure warning is disregarded. Further input to the controller 14 is a brake signal 28 indicative of whether the vehicle brakes are applied. If the vehicle brakes are applied, the position data is ignored such that the data is not recorded and updated and the lane departure warning system may be turned off or ignored such that the data is not recorded or updated and a lane departure warning is disregarded. Accordingly, the input signals 20, 22, 24 and 28 may be compared to on/off or threshold values and used to determine whether or not to allow the lane departure warning system 12 to be employed to update learned paths and generate lane departure warnings.

Additionally, an optical imager, such as a camera 80 may be included in the lane departure warning system 12, according to one embodiment. The camera 80 may be located on the front of the vehicle 10, according to one embodiment, and may acquire images of the roadway generally in front of the vehicle 10. The images acquired by the camera 80 may be processed to locate lane markings on the roadway, such as painted lines or other lane indicators, using known video image processing techniques, such as image recognition. It should be appreciated that one or a plurality of cameras may be employed located at various locations on board the vehicle 10.

Global positioning system (GPS) receiver 26 provides position data input to the lane departure warning controller 14. GPS position data includes the longitude and latitude position coordinates generated by the GPS receiver 26. It should be appreciated that any of a number of commercially available GPS receivers may be employed to provide the sensed position of the vehicle 10. Current GPS receivers offer a very high accuracy. Some current GPS receivers provide accurate position information to within ±12 meters, while other GPS receivers may provide reliable and better accuracy. With the added assistance of GPS repeaters, the accuracy of the acquired GPS data may be as accurate as ±2 cm. While a single GPS receiver is shown, it should be appreciated that a plurality of GPS receivers, such as first and second GPS receivers, may be employed. By employing two GPS receivers on board the vehicle 10 mounted at a known distance apart from each other, enhanced position accuracy may be achieved in addition to determining vehicle yaw. While a GPS receiver 26 is disclosed herein, it should be appreciated that any known position sensing sensor may be employed to sense position of the vehicle 10 for use in the lane departure warning system 12 of the present invention.

The lane departure warning controller 14 provides an output signal shown as a warning output 30. The warning output 30 is indicative of an identified departure of the vehicle 10 from a learned lane on the roadway. It should be appreciated that any of a number of output signals may be employed as the warning output 30 including visible displayed warnings and audible signal alerts. Additionally, it should be appreciated that the warning output 30 may be made available to any of a number of other systems or devices on board the vehicle 10, such as for example, an active steering system to allow the vehicle 10 to automatically steer the vehicle 10 back into the lane, or to turn on the vehicle headlights or pretension the seatbelts, as well as perform other actions.

The lane departure warning controller 14 further outputs data off board the vehicle 10. This is achieved by uploading data to a central data base at block 90 via a transceiver 88. The central database may include a service provider, such as OnStar®. The central database may be included in a service made available to other vehicles, such that learned vehicle path data may be usable by a plurality of vehicles traveling on the roadway. The data upload may be implemented by the transceiver 88 communicating via satellite communication, cell phone communication, or other wireless communications.

Figure 2:
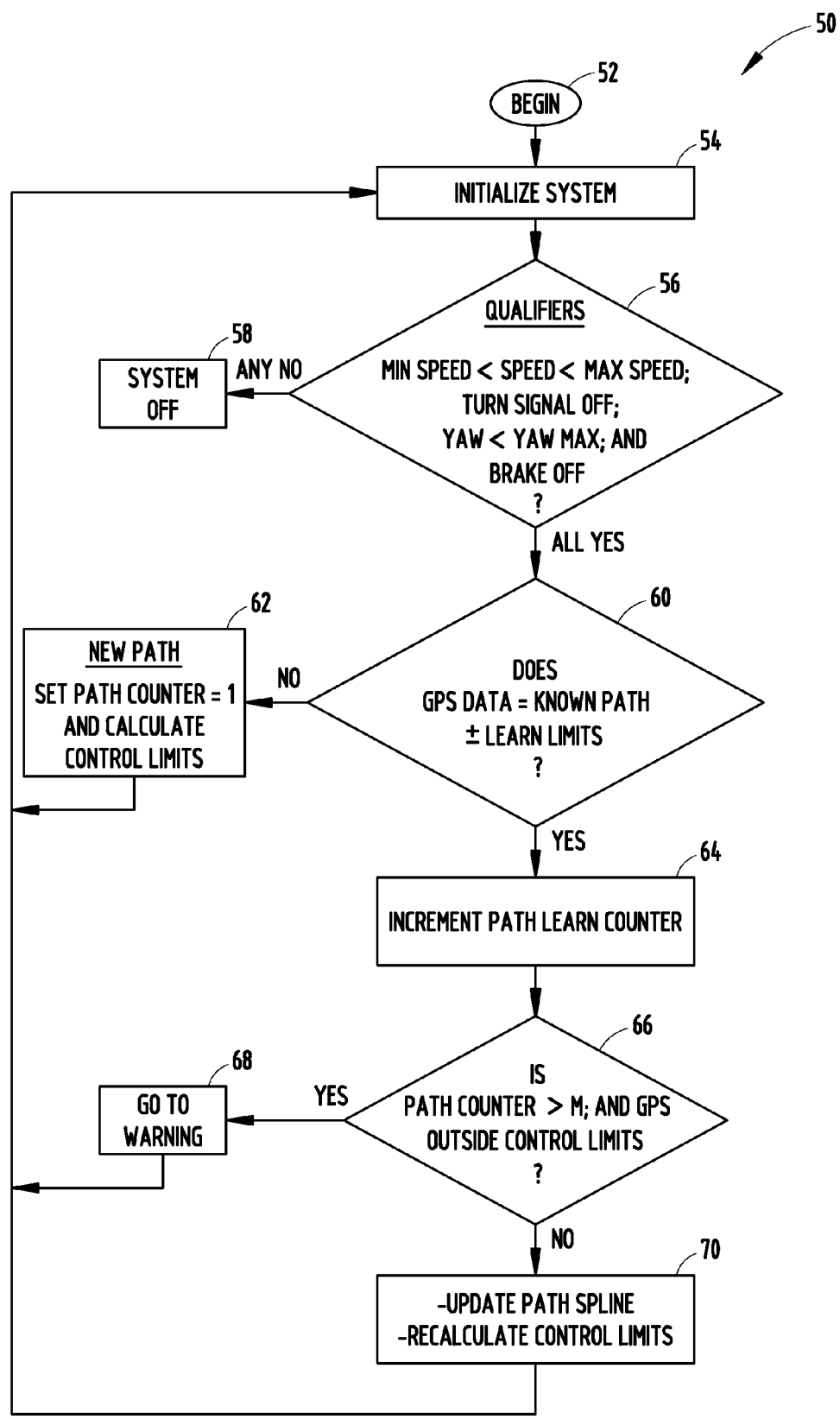
FIG. 2 is a flow diagram illustrating a lane departure warning routine for detecting departure of the vehicle from a lane, according to one embodiment.

Referring to FIG. 2, the lane departure warning routine 50 is illustrated, according to one embodiment. Routine 50 begins at step 52 and proceeds to initialize the lane departure warning system in step 54. Following initialization of the system, routine 50 proceeds to check certain qualifiers indicative of a normal routine driving condition within a lane of a roadway in decision step 56. Qualifiers include checking and comparing speed of the vehicle to a minimum speed threshold and a maximum speed threshold to determine whether the vehicle is travelling at a normal driving speed. The qualifiers also include determining if the turn signal is on or off, comparing the sensed yaw to a yaw maximum threshold, and determining if the vehicle brake is applied or not. An excessive yaw, an anticipated steered turn or a braking of the vehicle may indicate that a driver of the vehicle may intentionally steer the vehicle out of the current lane. If the vehicle speed is not between the minimum and maximum speed thresholds, or if the turn signal is on, or if the sensed yaw is equal to or exceeds the yaw maximum threshold, or if the vehicle brake is applied, then routine 50 proceeds to step 58 to not record the position data, to not update the travel path, and to essentially turn the lane departure warning system off or otherwise ignore the system.

If all of the qualifiers including the vehicle speed is between the minimum and maximum speed thresholds, the turn signal is off, the sensed yaw is less than the maximum threshold yaw, and the vehicle brake is off, then routine 50 proceeds to decision step 60. In decision step 60, routine 50 determines whether the GPS data matches a known path within limits defined by ±learn limits. The known path may be based on calculated GPS coordinates of the current vehicle position. The learn limits may be a set distance off of a known path, such as five feet, according to one example. It should be appreciated that the position data generated by the GPS receiver is recorded periodically in memory every i seconds. The rate at which the acquired position data is recorded may be speed dependent, such that the data recording rate increases with increased speed of the vehicle. The captured position data is then processed to create a lane area for target information. If the acquired GPS data does not represent a known path stored in memory, then routine 50 proceeds to step 61 to record X number of GPS data points and to calculate a spline based on the recorded GPS data points. The X number of GPS data points may be twenty data points, according to one example. Routine 50 then proceeds to step 62 to identify a new path of the vehicle and sets the path counter for the new path equal to one, and further calculates control limits defining the limits of the new path. Following step 62, routine 50 returns to step 54. If the sensed GPS data represents a known path stored in memory, then routine 50 proceeds to step 64 to increment the path learned counter. The path learned counter thereby keeps a count value as to the number of times that a particular path is identified as being traveled based on the acquired GPS data.

Next, routine 50 proceeds to decision step 66 to determine if the path counter value is greater than a threshold M and if the acquired GPS data is outside of the control limits. The control limits may be a calculated standard deviation limits as follows. Using the distance of the actual points from the calculated spline, you determine a value $\Delta(i)$. Then you can calculate a range, $R(i)=\Delta(i)-\Delta(i-1)$. This gives a measure of variation from point to point. You take that average value of $R(i)$ for a certain number of points. The value of stdev=Average®/d2. If we use ten points to get the average R then d2=3.076. Once you get a significant number of points near the area of interests, the value for stdev can be calculated as the direct statistical parameter. The value 2 can be changed to make tighter or looser limits. A pretty typical starting point is around 2.6. The path learn counter contains a count value indicative of the number of times a vehicle has traveled over a path at or near the current GPS position coordinates. If the path counter value exceeds the threshold count M, then the confidence of the learned path is determined to be high and the vehicle is considered to have regularly traveled the path and it is assumed that the path defines a lane of the roadway. Provided that the path counter value exceeds the path count threshold M and the GPS data is outside of the control limits, then the routine 50 determines that the vehicle has departed from a lane and proceeds to step 68 to output a lane departure warning output. The warning output may include a visual and/or audible output to alert the driver of the vehicle about the departure of the vehicle from a lane. Following issuance of the warning output, routine 50 returns to step 54.

If the path counter is not greater than the counter threshold M or if the GPS data is determined to be within the control limits, then routine 50 proceeds to step 70 to update the path spline and to recalculate the control limits using the recent sensed GPS data, before returning to step 54. Thus, routine 50 uses the sensed GPS data to update the learned path.

Figure 3:
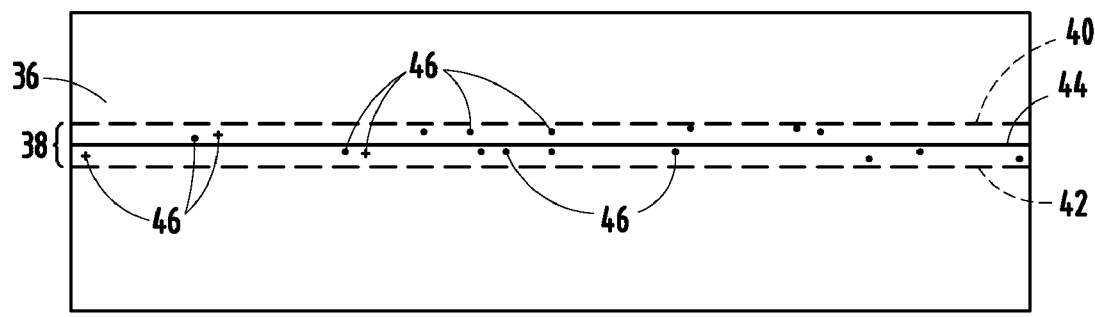
FIG. 3 is a schematic diagram illustrating one example of sensed vehicle positions on a straight roadway with control limits generally defining a lane.

Referring to FIG. 3, an example of sensed GPS data for a vehicle traveling on a straight path or lane 38 on a roadway 36 is illustrated. As the vehicle travels along the roadway, the sensed position data 46 is acquired and a spline 44 is acquired which is a line that passes through an average of the sensed position data 46 as shown. The spline 44 is the center line of the path of travel of the vehicle. Control limits 40 and 42 on either side of the spline 44 are provided to define a width of the learned lane. It should be appreciated that if sensed position data deviates beyond the control limits 40 and 42 to a region outside of the learned lane 38, then a departure of the vehicle from a lane will be detected. The road path is calculated by calculating the spline 44 through recorded position data 46. Updates may use ±N data points before and after the sensed location to calculate and update the spline 44. The control limits may be calculated by determining the difference in actual position and projected spline position for the nearest j points (e.g., twenty points). If the control limits are less than a minimum value, then a minimum level may be used.

Figure 4:
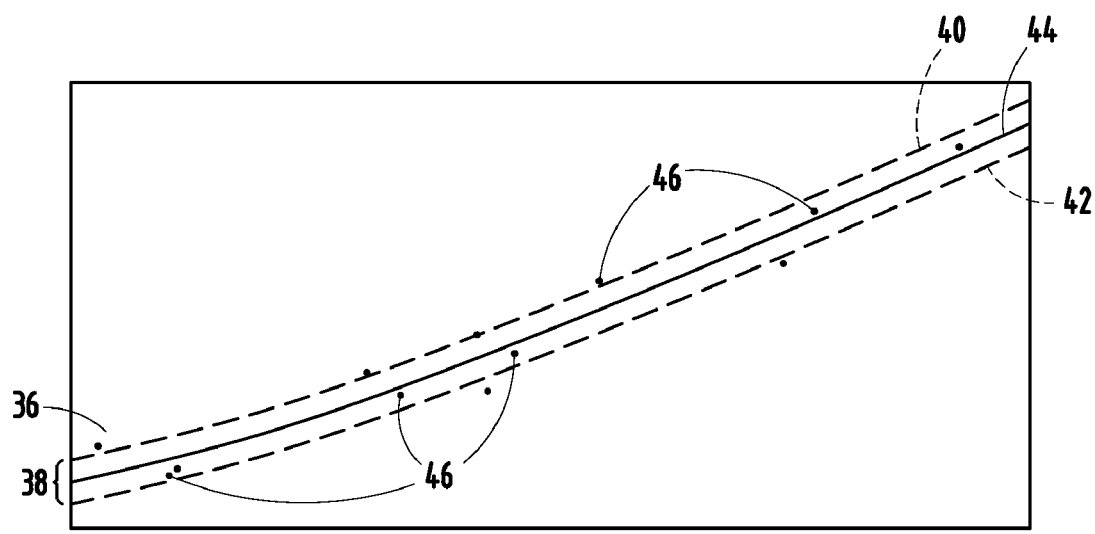
FIG. 4 is a schematic diagram illustrating another example of sensed vehicle positions on a curved roadway with control limits defining the lane.

Referring to FIG. 4, an example of GPS data sensed for a vehicle traveling on a curved path or lane 38 of a roadway 36 is illustrated. The sensed position data 46 is shown by points 46 and a center line spline 44 is taken through an average of the sensed position data points. The control limits 40 and 42 are taken on either side of the spline 44. In this situation, the spline 44 is shown as a curved line following a curvature in the road. If the vehicle deviates beyond the control limits 44 or 42, then the vehicle is determined to be departing from the path 38 of the roadway 36. If a given path is known to follow a curve, the vehicle 10 may utilize the learned path information to enhance the operation of the vehicle. For example, vehicle headlights may be directed around corners to provide enhanced visibility based on the learned path curvature, in addition to steering input. Additionally, speed warnings can be provided if the operator is traveling too fast based on a learned path.

Figure 5:
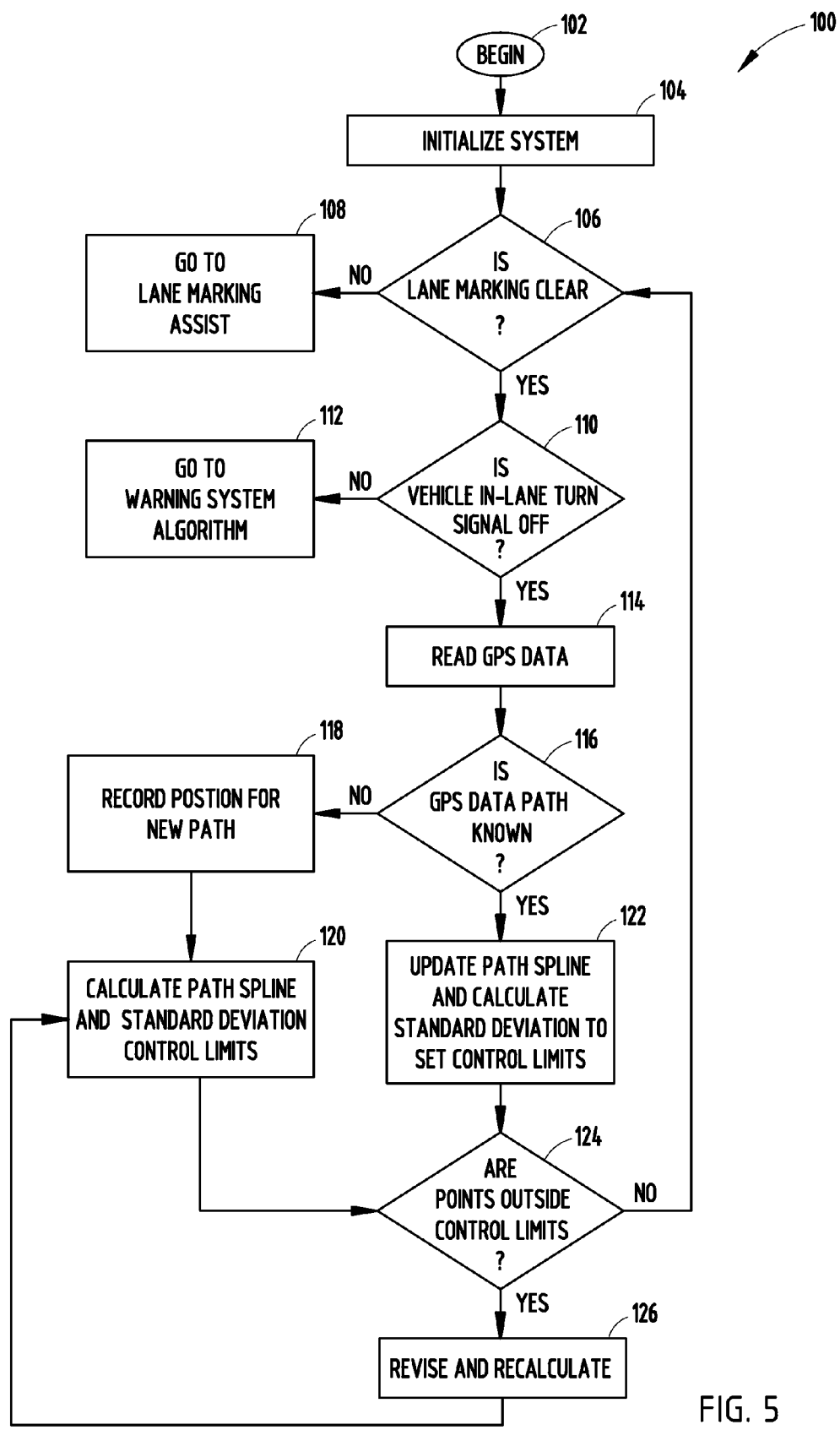
FIG. 5 is a flow diagram illustrating a lane departure warning routine processing camera images, according to a second embodiment.

The lane departure warning system 12 may operate to execute a lane departure warning routine with camera image 100 and lane marking assist routine 150, according to a second embodiment. The lane departure warning routine 100 is shown in FIG. 5. Routine 100 begins at step 102 and proceeds to initialize the system at step 104. Next, routine 100 proceeds to decision step 106 to determine if lane markings are clear such that they are visible and unobstructed. The lane markings may be determined to be clear by processing video images generated by one or more cameras in close proximity to the vehicle, such as generally in the direction forward of the vehicle. If the lane markings are determined not to be clear, such as when they are covered by snow, leaves, salt, dirt or other matter or are otherwise generally not sufficiently visible, then routine 100 proceeds to step 108 to go to the lane marking assist routine which monitors position of the vehicle within a known path based on sensed position signals and provides a warning when the vehicle departs the path.

If the lane markings are determined to be sufficiently clear, routine 100 proceeds to decision step 110 to determine whether the vehicle is in a recognized stored lane while the turn signal is off. If the vehicle is determined not to be in a recognized stored lane of the roadway while the turn signal is off, routine 100 proceeds to step 112 to go to the warning system algorithm to provide a lane departure warning to the vehicle operator. If the vehicle is determined to be within a recognized stored lane while the turn signal is off, routine 100 then proceeds to determine if the path of the vehicle is a known path in step 116. If the path of the vehicle is not a known path, routine 100 proceeds to step 118 to record the sensed position data for the new vehicle path, and then proceeds to step 120 to calculate a path spline for the new vehicle path and to calculate standard deviation control limits for the new path. The new path data is stored in memory. The standard deviation control limits may be ±5 feet, according to one embodiment, such that the width of a conventional road lane is provided.

If the determined current vehicle path is a known path, as determined by step 116, routine 100 proceeds to step 122 to update the spline path for the known path and to calculate a standard deviation to set control limits for the known path, thereby providing a position update to the known path. The updated spline path and standard deviation data is stored in memory. Following either steps 120 or 122, routine 100 proceeds to step 124 to determine if the current position points are outside of the control limits. If the position points are outside of the control limits, routine 100 proceeds to step 126 to revise and recalculate the path spline and standard deviation control limits, which are stored in memory. If the points are not outside of the control limits, then routine 100 returns to step 106.

Figure 6:
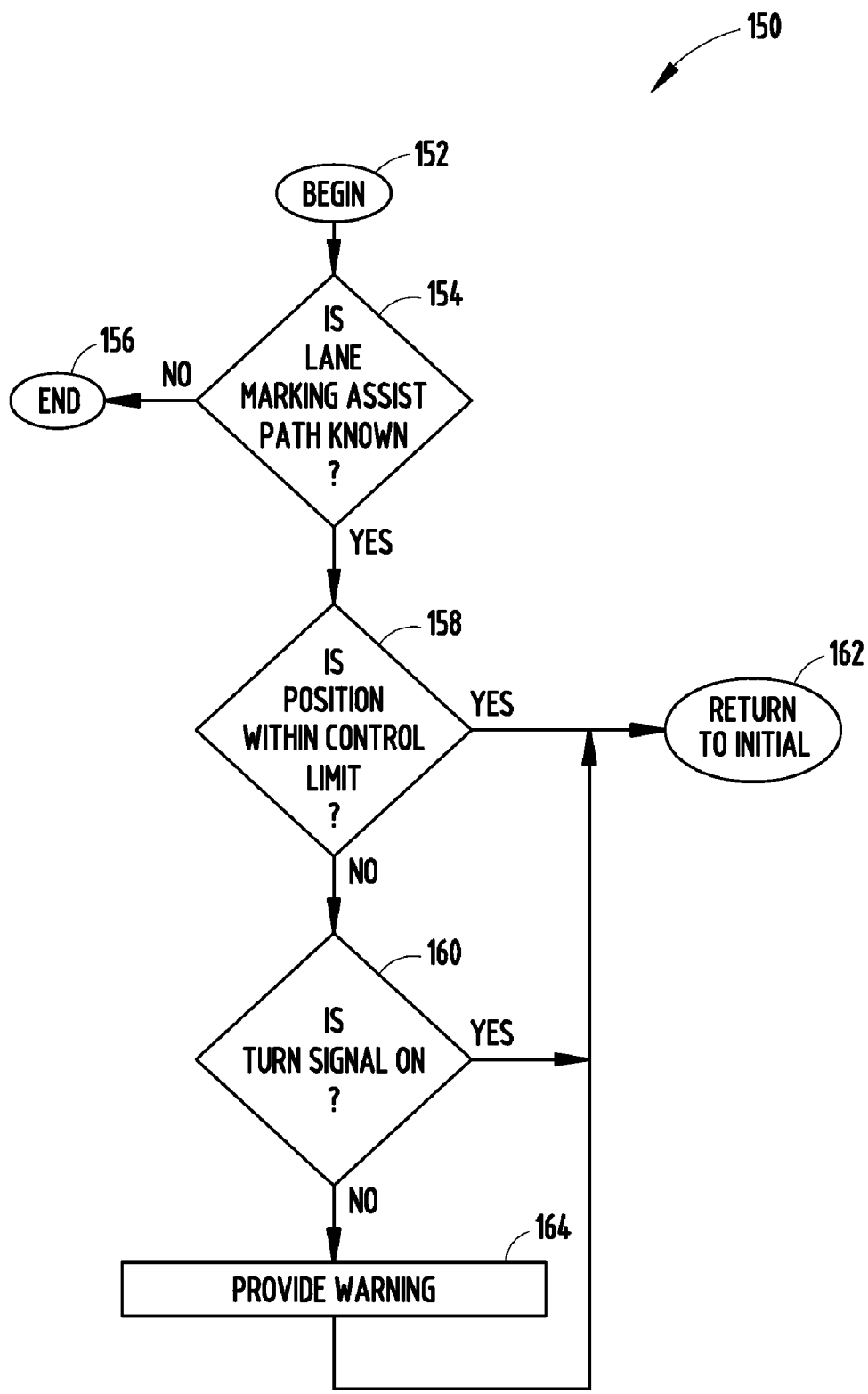
FIG. 6 is a flow diagram illustrating a lane marking assist routine, according to the second embodiment.

The lane marking assist routine 150 is shown in FIG. 6, according to one embodiment. Routine 150 begins at step 152 and proceeds to decision step 154 to determine if the lane marking is a known path. If the lane marking is not on a known path, routine 150 ends at step 156. If the path is known, routine 50 proceeds to decision step 158 to determine if the current position is within the control limits defining a roadway and, if so, returns to routine 100, particularly the step of initializing the system. If the position is determined not to be within the control limits, then routine 150 determines if the turn signal is on and, if so, returns to routine 100. If the turn signal is not on, routine 150 proceeds to step 164 to provide a lane departure warning output. Accordingly, the lane marking assist routine 150 is used when lane markings are not clear. It should be appreciated that the lane departure warning system 12 may advantageously warn a driver of the vehicle when the vehicle departs from a lane, beyond the control limits. Further, it should be appreciated that the lane departure warning system 12 may provide a display of the lane and roadway. The display of the lane and roadway may be presented on a headup display (HUD) projected into the vehicle windshield, generally forward of the vehicle driver, according to one embodiment.

Accordingly, it should be appreciated that the lane departure warning system 12 and method of the present invention advantageously detects the departure of a vehicle 10 from a lane or roadway in a manner that is easy to implement and cost affordable. The system 12 advantageously does not require a camera; however, it should be appreciated that the lane departure system 12 and method may be employed in connection with or in combination with a camera or other optical system. It should further be appreciated that the sensed path data may further be uploaded to a central database and made available for use by the vehicle 10 and other vehicles. It should further be appreciated that the lane departure system 12 advantageously learns changes in the lanes of the roadway over time.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle lane departure warning system comprising:
   a position sensor for sensing position of a vehicle;
   memory storing learned vehicle path data;
   a controller for processing the sensed position and determining a stored learned vehicle path that the vehicle is travelling on, said controller comprising logic for comparing the sensed position to the stored learned vehicle path and determining if the vehicle is sufficiently departing from the stored learned path by
      sensing position of a vehicle and generating position data,
      processing the sensed position data of the vehicle,
      determining a learned vehicle path that the vehicle is travelling on based on the sensed position data,
      applying a confidence level to the learned vehicle path, wherein the confidence level provides an indication as to the number of times the vehicle path has been traveled by the vehicle,
      updating a learned path when the confidence level is less than the threshold value;
      storing the learned vehicle path in memory,
      updating the stored learned vehicle path as the vehicle repeatedly travel on the path;
      comparing the sensed position to the stored learned vehicle path,
      determining whether the vehicle is sufficiently departing from the stored learned vehicle path based on the comparison, and
      providing a warning signal indication output if the vehicle is determined to be departing from the stored learned vehicle path; and
   an output for providing a warning signal indicative of the vehicle departing from the stored learned path.

2. The system as defined in claim 1, wherein the position sensor comprises a global positioning system (GPS) receiver.

3. The system as defined in claim 1, wherein the logic determines a spline path generally centered about the sensed position data and compares the path data to control limits relative to the spline path.

4. The system as defined in claim 1, wherein the system detects a turn signal indication and disregards a lane departure warning when a turn detection signal indication is detected.

5. The system as defined in claim 1 further comprising a yaw sensor, wherein the logic compares sensed vehicle yaw to a yaw maximum value and disregards a lane departure warning when the sensed yaw exceeds the yaw threshold.

6. The system as defined in claim 1 further comprising a brake signal input, wherein the logic disregards providing a warning output when the brake signal is applied.

7. The system as defined in claim 1, wherein the vehicle is a wheeled vehicle traveling on a roadway.

8. A method of monitoring movement of a vehicle on a roadway and warning of a lane departure, said method comprising the steps of:
   sensing position of a vehicle and generating position data;
   processing the sensed position data of the vehicle;
   determining a learned vehicle path that the vehicle is travelling on based on the sensed position data;
   applying a confidence level to the learned vehicle path, wherein the confidence level provides an indication as to the number of times the vehicle path has been traveled by the vehicle;
   updating a learned path when the confidence level is less than the threshold value;

storing the learned vehicle path in memory;

updating the stored learned vehicle path as the vehicle repeatedly travel on the path;

comparing the sensed position to the stored learned vehicle path;

determining whether the vehicle is sufficiently departing from the stored learned vehicle path based on the comparison; and providing a warning signal indication output if the vehicle is determined to be departing from the stored learned vehicle path.

9. The method as defined in claim 8, wherein the step of sensing position of the vehicle and generating position data is performed by a GPS receiver.

10. The method as defined in claim 8 further comprising a step of comparing the confidence level to a threshold value and applying the warning output only when the confidence level exceeds the threshold.

11. The method as defined in claim 8 further comprising the step of calculating a spline path generally centered about the sensed position data and comparing the sensed position data to control limits relative to the spline path.

12. The method as defined in claim 8 further comprising the step of detecting a turn signal indication and disregarding the warning output when a turn detection signal indication is detected.

13. The method as defined in claim 8 further comprising the step of sensing vehicle yaw and comparing the sensed vehicle yaw to a yaw maximum value and disregarding a warning output when the sensed yaw exceeds the yaw threshold.

14. The method as defined in claim 8 further comprising the step of sensing vehicle braking and disregarding providing a warning output when vehicle braking is detected.

15. The method as defined in claim 8, wherein the vehicle is a wheeled vehicle traveling on a roadway.

\* \* \* \* \*